US009388984B2

(12) United States Patent
Anderson (10) Patent No.: US 9,388,984 B2
(45) Date of Patent: Jul. 12, 2016

(54) FLAME DETECTION IN A FUEL FIRED APPLIANCE

(75) Inventor: Peter Anderson, St. Paul, MN (US)

(73) Assignee: Honeywell International Inc., Morris Plains, NJ (US)

(*) Notice: Subject to any disclaimer, the term of this patent is extended or adjusted under 35 U.S.C. 154(b) by 1255 days.

(21) Appl. No.: 12/757,543

(22) Filed: Apr. 9, 2010

(65) Prior Publication Data

US 2011/0250546 A1    Oct. 13, 2011

(51) Int. Cl.
| | |
|---|---|
| *F23D 14/72* | (2006.01) |
| *F23D 14/36* | (2006.01) |
| *F23D 11/00* | (2006.01) |
| *F23D 11/42* | (2006.01) |
| *F23N 5/14* | (2006.01) |
| *F23N 5/12* | (2006.01) |
| *F23N 5/24* | (2006.01) |
| *G05B 23/02* | (2006.01) |

(52) U.S. Cl.
CPC ............ *F23D 14/725* (2013.01); *F23D 11/001* (2013.01); *F23D 11/42* (2013.01); *F23D 14/36* (2013.01); *F23D 14/72* (2013.01); *F23N 5/123* (2013.01); *F23N 5/143* (2013.01); *F23N 5/242* (2013.01); *G05B 23/0235* (2013.01); *F23D 2207/00* (2013.01); *F23N 2027/02* (2013.01); *F23N 2027/36* (2013.01); *F23N 2031/12* (2013.01)

(58) Field of Classification Search
CPC ...... G05B 23/0235; G05B 23/02; F23Q 9/08; F23Q 9/12; F23Q 9/14; F23D 2209/00; F23D 2207/00; F23D 14/72; F23D 14/725; F23D 11/42; F23N 5/143; F23N 5/13; F23N 5/242; F23N 5/24; F23N 5/123; F23N 5/12; F23N 2027/02; F23N 2027/12; F23N 2027/14; F23N 2027/16; F23N 2027/36; F23N 2031/12; F23N 2031/06; F23N 2031/08
USPC ......... 431/2, 6, 13, 14, 15, 16, 24, 25, 74, 75, 431/76, 77, 78, 79; 700/274, 275
See application file for complete search history.

(56) References Cited

U.S. PATENT DOCUMENTS

| | | | |
|---|---|---|---|
| 3,574,496 A | 4/1971 | Hewitt | |
| 3,887,325 A | 6/1975 | Finger et al. | |
| 4,033,711 A | 7/1977 | Christian et al. | |
| 4,906,177 A | 3/1990 | Newberry et al. | |
| 4,923,117 A * | 5/1990 | Adams .................... | F23N 1/002 702/108 |
| 5,090,895 A | 2/1992 | Jensen et al. | |

(Continued)

OTHER PUBLICATIONS

Beckett Residential Burners, "AF/AFG Oil Burner Manual," 24 pages, Aug. 2009.

(Continued)

*Primary Examiner* — Kenneth Rinehart
*Assistant Examiner* — Tavia Sullens
(74) *Attorney, Agent, or Firm* — Seager, Tufte & Wickhem, LLP (57) ABSTRACT

A control system for a fuel-fired appliance and methods of operating are disclosed. When an electrical characteristic of a flame detector fails to cross a threshold level during an ignition attempt and when the electrical characteristic of the flame detector changes by a predetermined amount, the control system may activate an indicator indicating a problem with the flame detector (e.g. dirty, misaligned, or otherwise unable to properly detect the flame).

19 Claims, 6 Drawing Sheets

(56) References Cited

U.S. PATENT DOCUMENTS

| | | | |
|---|---|---|---|
| 5,174,743 | A | 12/1992 | Wellman et al. |
| 5,180,301 | A | 1/1993 | Gross |
| 5,236,328 | A | 8/1993 | Tate et al. |
| 5,261,609 | A | 11/1993 | Roth |
| 5,346,391 | A | 9/1994 | Fullemann et al. |
| 5,368,230 | A | 11/1994 | Oppenberg |
| 5,515,297 | A | 5/1996 | Bunting |
| 5,567,143 | A | 10/1996 | Servidio |
| 5,636,981 | A | 6/1997 | Lilly |
| 5,722,822 | A * | 3/1998 | Wilson et al. ................ 431/78 |
| 5,795,462 | A | 8/1998 | Shurtleff |
| 5,812,061 | A * | 9/1998 | Simons ........................ 431/24 |
| 5,899,684 | A | 5/1999 | McCoy et al. |
| 5,921,470 | A | 7/1999 | Kamath |
| 6,004,127 | A | 12/1999 | Heimberg et al. |
| 6,084,518 | A * | 7/2000 | Jamieson ............... F23N 5/123 340/577 |
| 6,092,738 | A | 7/2000 | Becker |
| 6,099,295 | A | 8/2000 | McCoy et al. |
| 6,119,954 | A | 9/2000 | Kamath |
| 6,135,366 | A | 10/2000 | Bodelin et al. |
| 6,260,773 | B1 | 7/2001 | Kamath |
| 6,561,792 | B1 | 5/2003 | Pfund |
| 6,700,495 | B2 | 3/2004 | Mindermann et al. |
| 6,829,123 | B2 | 12/2004 | Legatti et al. |
| 6,953,161 | B2 | 10/2005 | Laursen et al. |
| 7,492,269 | B2 * | 2/2009 | Matteson et al. ................ 431/75 |
| 2006/0084019 | A1 | 4/2006 | Berg et al. |
| 2007/0143000 | A1 | 6/2007 | Bryant et al. |
| 2009/0017406 | A1 | 1/2009 | Farias Fuentes et al. |
| 2010/0291494 | A1 * | 11/2010 | Branecky et al. ................ 431/78 |

OTHER PUBLICATIONS

U.S. Appl. No. 12/757,502 filed Apr. 9, 2010.
U.S. Appl. No. 12/757,427 filed Apr. 9, 2010.
Honeywell, "S9230F1006 2-Stage Hot Surface Ignition Integrated Furnace Controls, Installation Instructions," 20 pages, 2006.
Tradeline, "Oil Controls, Service Handbook," 84 pages, prior to Apr. 9, 2010.
Underwriters Laboratories Inc. (UL), "UL 296, Oil Burners," ISBN 1-55989-627-2, 107 pages, Jun. 30, 1994.

* cited by examiner

FLAME DETECTION IN A FUEL FIRED APPLIANCE

FIELD

The present disclosure relates generally to fuel fired appliances, and more particularly, to systems and methods for detecting the presence or absence of a flame during ignition trials in a fuel fired appliance.

BACKGROUND

Numerous fuel fired appliances have an igniter for igniting the fuel upon command. Fuel fired appliances include, for example, heating, ventilation, and air conditioning (HVAC) appliances such as furnaces, boilers, water heaters, as well as other HVAC appliances and non-HVAC appliances. Fuel fired appliances typically have a combustion chamber and a burner. A fuel source, such as a gas or oil, is typically provided to the burner through a valve or the like. In many cases, various electrical and/or electromechanical components are provided to help control and/or otherwise carry out the intended function of the fuel fired appliance. For example, various controllers, motors, igniters, blowers, switches, motorized valves, motorized dampers, and/or others, are often included in, or are used to support, a fuel fired appliance.

One particular type of fuel fired appliance is a fuel fired furnace. Fuel fired furnaces are frequently used in homes and office buildings to heat intake air received through return ducts and distribute heated air through warm air supply ducts. Such furnaces typically include a circulation blower or fan that directs cold air from the return ducts across metal surfaces of a heat exchanger to heat the air to an elevated temperature. A burner is often used to heat the metal surfaces of the heat exchanger. The air heated by the heat exchanger can be discharged into the supply ducts via the circulation blower or fan, which produces a positive airflow within the ducts.

In some instances, the burner of the fuel fired appliance may fail to ignite the fuel during an ignition trial. For safety and other reasons, many control systems for fuel fired appliances include a flame detector to detect the presence or absence of flame during or after ignition trials. If the flame detector fails to detect the presence of a flame in the burner, the control system may shut down the burner, and in some cases, enter a lockout state. Once in a lockout state, and in some cases, a service technician must be called to diagnose and correct the problem before the fuel filed appliance can return to an operational state.

Under some circumstances, such as when the flame detector has become dirty or misaligned, the flame detector may not detect the presence of a flame, even though a flame exists. This may require a significant amount of time for a service technician to diagnose the problem as it often results in intermittent operation of the appliance.

SUMMARY

The present disclosure relates generally to fuel fired appliances, and more particularly, to systems and methods for detecting the presence or absence of a flame during ignition trials in a fuel fired appliance. In one illustrative embodiment, a fuel-fired appliance includes a burner assembly configured to selectively receive and ignite a fuel to produce a flame. A flame detector provides an electrical signal that indicates the presence or absence of a flame. During normal operation, a controller may monitor the electrical signal provided by the flame detector. If the flame detector fails to detect the presence of a flame in the burner during an ignition trial, the controller may shut down the burner, and in some cases, enter a lockout state. While monitoring the electrical signal provided by the flame detector, the controller may determine if the flame detector could be simply dirty, misaligned or otherwise marginal. If the controller determines that the flame detector might be dirty, misaligned or otherwise marginal, the controller may issue a notification, which may indicate to a service technician to check the flame detector. Such a feature may reduce the time needed for a service technician to diagnosis and identify a marginal flame detector in a fuel fired appliance system.

In some cases, the controller may be a controller of a fuel-fired appliance. Functionally, the controller may include, among other things, a flame detection module, a flame detector error notification module, and a control block. The control block may be coupled to the flame detection module and the flame detector error notification module, and may be configured to receive an electrical signal from the flame detection module. The control block may determine whether or not an electrical characteristic of the electrical signal from the flame detection module crosses a threshold level during and/or after an ignition attempt. If so, the control block may determine that a flame is present, and the fuel fired appliance may be allowed to operate normally. However, the control block may also be configured to activate the flame detector error notification module, indicating a potential problem with the flame detection module. For example, and in some instances, the control block may be configured to activate the flame detector error notification module when: the electrical characteristic of the electrical signal fails to cross the threshold level; and the change of the electrical characteristic is more than a predetermined amount. This may indicate that the flame detection module is dirty or misaligned. In some cases, the flame detector error notification module may include an audible alarm, an error light, and/or any other suitable notification. In some cases, the flame detection module may include a flame detector such as a cadmium sulfide (CAD) cell or a flame sensing rod.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION

The invention may be more completely understood in consideration of the following detailed description of various illustrative embodiments of the disclosure in connection with the accompanying drawings, in which.

DETAILED DESCRIPTION

The following description should be read with reference to the drawings wherein like reference numerals indicate like elements throughout the several views. The detailed description and drawings show several embodiments which are meant to be illustrative of the claimed invention.

For illustrative purposes only, much of the present disclosure has been described with reference to an oil-fired furnace. However, this description is not meant to be so limited, and it is to be understood that the features of the present disclosure may be used in conjunction with any suitable fuel-fired system utilizing a flame detector or flame detection system. For example, it is contemplated that the features of the present disclosure may be incorporated into an oil-fired furnace, an oil-fired water heater, an oil-fired boiler, a gas-fired furnace, a gas-fired boiler, a gas-fired water heater, and/or other suitable fuel-fired system, as desired.

Figure 1:
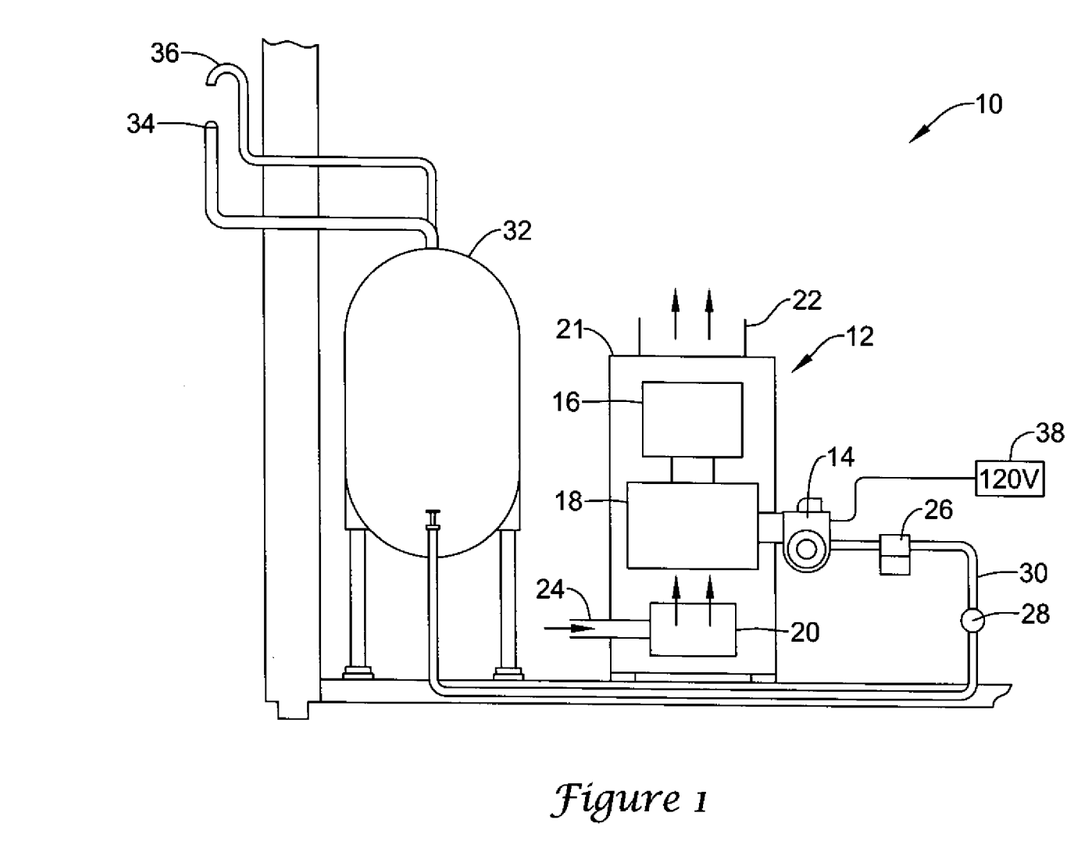
FIG. 1 is a schematic diagram of an illustrative embodiment of an oil-fired HVAC system for a building or other structure.

FIG. 1 is a schematic diagram of an illustrative embodiment of an oil-fired HVAC system 10 for a building or other structure. As illustrated, the HVAC system 10 includes a storage tank 32 and an oil fired appliance 12 including a burner 14. Oil can be stored in storage tank 32 and fed to the burner 14 of the fuel fired appliance 12 via a supply line 30. As illustrated, storage tank 32 may include an air vent 36 and a fill line 34 for filling the storage tank 32 with oil, but these are not required. For mere exemplary purposes, the storage tank 32 is illustrated as an above-ground storage tank, but may be implemented as a below ground storage tank or any other suitable oil storage tank, as desired. Alternatively, oil or another fuel may be provided directly to the oil fired appliance 12 via a pipe from a utility or the like, depending on the circumstances.

A valve 28 is shown situated in the supply line 30. The valve 28 can provide and/or regulate the flow of oil from the storage tank 32 (or utility) to the burner 14. In some embodiments, valve 28 may regulate the oil pressure supplied to the burner 14 at specific limits established by the manufacturer and/or by an industry standard. Such a valve 28 can be used, for example, to establish an upper limit to prevent over-combustion within the appliance 12, or to establish a lower limit to prevent combustion when the supply of oil is insufficient to permit proper operation of the appliance 12.

In some cases, a filter 26 may be situated in the supply line 30. The filter 26 may be configured to filter out contaminants and/or other particulate matter from the oil before the oil reaches the burner assembly 14 of the oil-fired appliance 12.

In the illustrative embodiment, oil-fired appliance 12, illustratively an oil-fired furnace, includes a circulation fan or blower 20, a combustion chamber/primary heat exchanger 18, a secondary heat exchanger 16, and an exhaust system (not shown), each of which can be housed within furnace housing 21. In some cases, the circulation fan 20 can be configured to receive cold air via a cold air return duct 24 (and/or an outside vent) of a building or structure, circulate the cold air upwards through the furnace housing 21 and across the combustion chamber/primary heat exchanger 18 and the secondary heat exchangers 16 to heat the air, and then distribute the heated air through the building or structure via one or more supply air ducts 22. In some cases, circulation fan 20 can include a multi-speed or variable speed fan or blower capable of adjusting the air flow between either a number of discrete airflow positions or variably within a range of airflow positions, as desired. In other cases, the circulation fan 20 may be a single speed blower having an "on" state and an "off" state.

Burner assembly 14 can be configured to heat one or more walls of the combustion chamber/primary heat exchanger 18 and one or more walls of the secondary heat exchanger 16 to heat the cold air circulated through the furnace. At times when heating is called for, the burner assembly 14 is configured to ignite the oil supplied to the burner assembly 14 via supply line 30 and valve 28, producing a heated combustion product. The heated combustion product of the burner assembly 14 may pass through the combustion chamber/primary heat exchanger 18 and secondary heat exchanger 16 and then be exhausted to the exterior of the building or structure through an exhaust system (not shown). In some embodiment, an inducer and/or exhaust fan (not shown) may be provided to help establish the flow of the heated combustion product to the exterior of the building.

In the illustrative embodiment, an electrical power source, such as a line voltage supply 38 (e.g. 120 volts, 60 Hz AC), may provide electrical power to at least some of the components of the oil-fired HVAC system 10, such as the oil-fired furnace and/or more specifically the burner assembly 14. The line voltage supply 38 in the United States typically has three lines, L1, neutral, and earth ground, and is often used to power higher power electrical and/or electromechanical components of the oil-fired HVAC system 10, such as circulation fan or blower 20, an ignition systems of the burner assembly 14, and/or other higher power components. In some cases, a step down transformer can be provided to step down the incoming line voltage supply 38 to a lower voltage supply that is useful in powering lower voltage electrical and/or electromechanical components if present, such as controllers, motorized valves or dampers, thermostats, and/or other lower voltage components. In one illustrative embodiment, the transformer may have a primary winding connected to terminals L1 and neutral of the line voltage supply 38, and a secondary winding connected to the power input terminals of controller to provide a lower voltage source, such as 24 volt 60 Hz AC voltage, but this is not required.

Although not specifically shown in FIG. 1, it is contemplated that the oil-fired HVAC systems may include other typical HVAC components including, for example, thermostats, sensors, switches, motorized valves, non-motorized valves, motorized dampers, non-motorized dampers, and/or others HVAC components, as desired.

Figure 2:
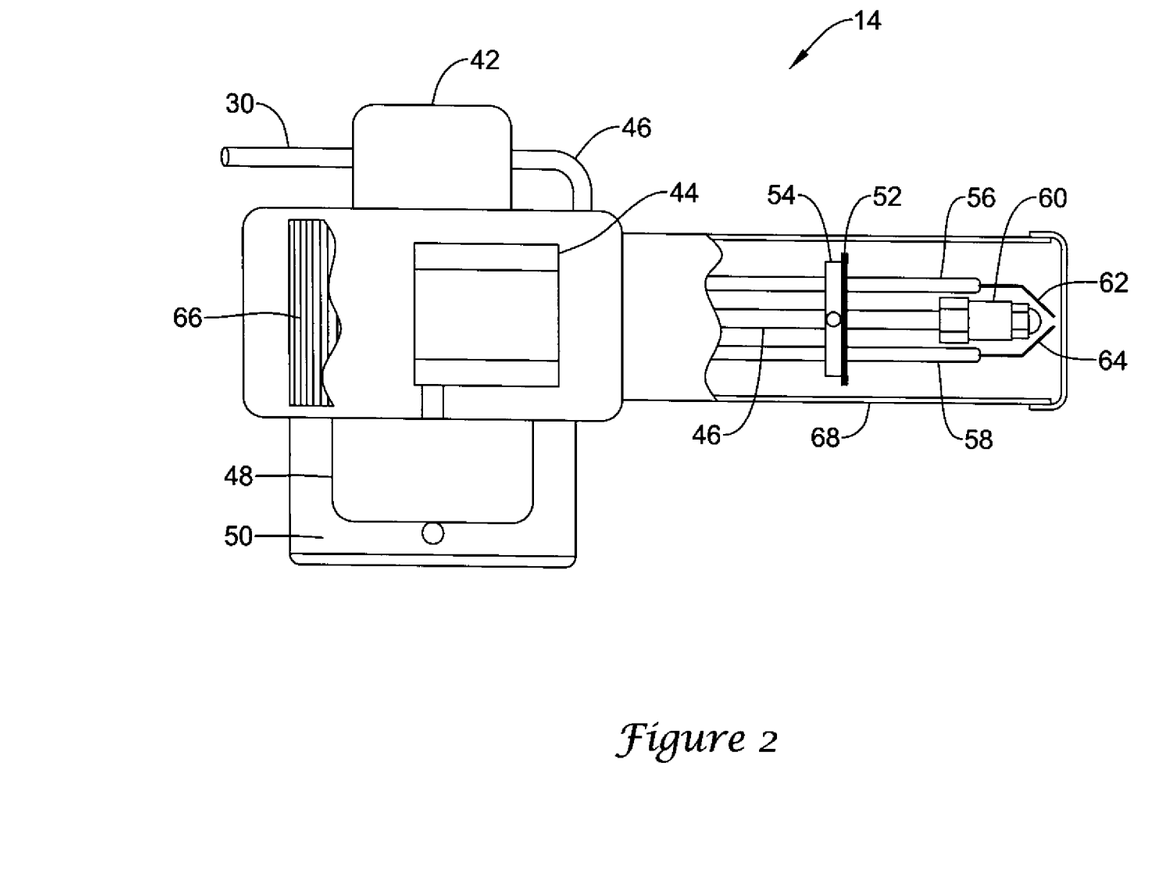
FIG. 2 is a partial cut-away top view of an illustrative oil-fired burner assembly of the HVAC system of FIG. 1.
Figure 3:
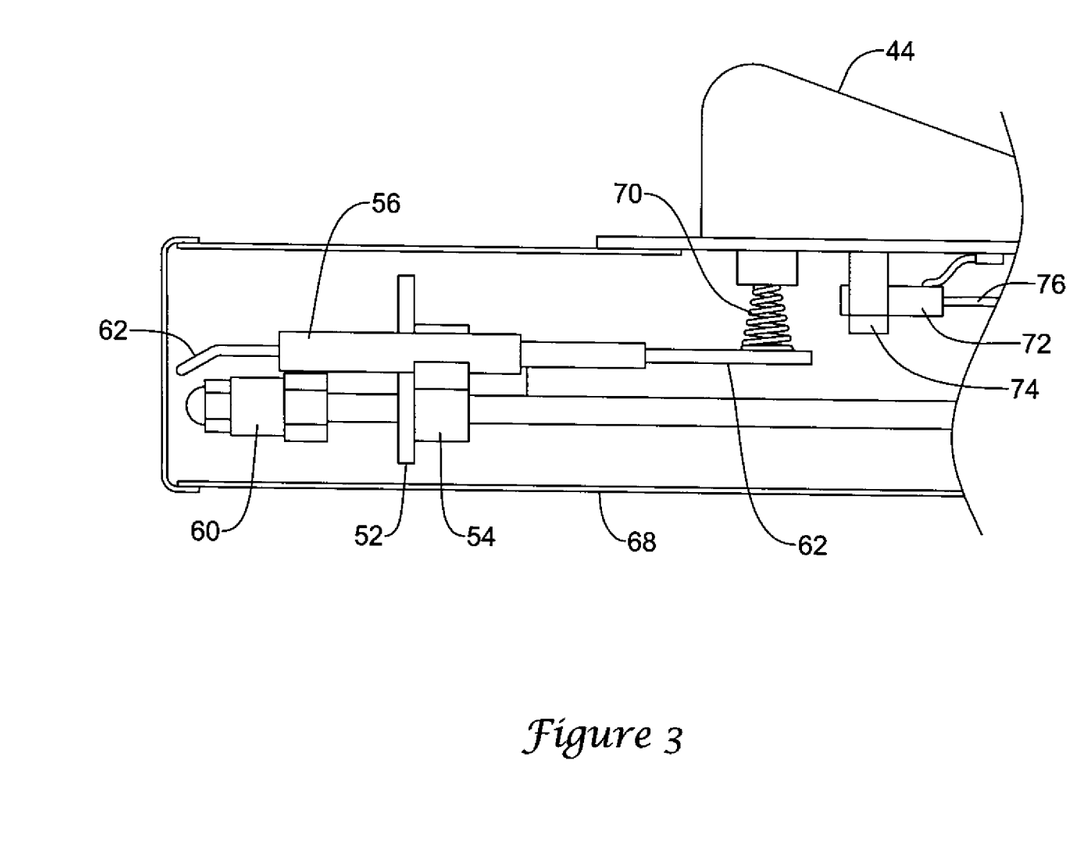
FIG. 3 is a partial cross-sectional view of the illustrative oil-fired burner assembly of FIG. 2.

FIG. 2 is partial cut-away top view and FIG. 3 is a partial cross-sectional view of an illustrative burner assembly 14 of the oil-fired HVAC system 10 of FIG. 1. In the illustrative embodiment, the burner assembly 14 is configured to atomize the oil (i.e. break the oil into small droplets) and mix the atomized oil with air to form a combustible mixture. The combustible mixture is sprayed into the combustion chamber/primary heat exchanger 18 of the oil-fired furnace (shown in FIG. 1) and ignited with a spark (or pilot flame) from an ignition system of the burner assembly 14.

In the illustrative embodiment, the burner assembly 14 may include a pump 42, a nozzle 60, a motor 50, a blower 66, an air tube 68, an ignition transformer 44, and the ignition system. The pump 42 may have an inlet connected to the oil supply line 30 and an outlet connected to the nozzle 60 via a nozzle line 46. The pump 42 may deliver oil under pressure to the nozzle 60. At the nozzle 60, the oil may be broken into droplets forming a mist that is sprayed into combustion chamber/primary heat exchanger 18. In some situations, the nozzle 60 may break the oil into a relatively fine, cone-shaped mist cloud.

At the same time as the oil mist is being sprayed into the combustion chamber/primary heat exchanger 18, the blower 66, which is driven by motor 50, may be configured to provide an airstream, which in some cases, may be a relatively turbulent airstream, through air tube 68 to mix with the oil mist sprayed into the combustion chamber/primary heat exchanger 18 by the nozzle 60 to form a good combustible mixture. In some cases, a static pressure disc 52 or other restrictor can be positioned in the air tube 68 to create the relatively turbulent airstream or air swirls to mix the airstream and oil mist.

In the illustrative embodiment, the ignition system of the burner assembly 14 may include one or more electrodes, such as electrodes 62 and 64, having one end electrically connected to the ignition transformer 44 and another end extending adjacent to the nozzle 60 and into the oil mist provided by the nozzle 60. When an electrical current is provided to electrodes 62 and/or 64 from the ignition transformer 44, the electrical current may create a "spark" that can ignite the combustible mixture and produce a flame. In some embodiments, the electrodes 62 and 64 may be secured and/or mounted relative to the nozzle 60 in the flow tube 68 with a mounting bracket 54. To electrically insulate the electrodes 62 and 64 from the mounting bracket 54, an insulated material or covering, shown as 56 and 58, may be provided over a portion of the electrodes 62 and 64. As shown in FIG. 3, one end of the electrodes 62 and 64 can be electrically connected to the ignition transformer 44 via one or more springs 70. However, it is contemplated that other suitable connectors may be used to electrically connect electrodes 62 and 64 to ignition transformer 44, as desired.

In the illustrative embodiment, a controller 48 may be included or electrically connected to the burner assembly 14. The controller 48, which may be an oil primary control, may be electrically connected to and/or control the operation of motor 50 for driving blower 66, ignition transformer 44, pump 42, and/or oil valve 28 in response to signals received from one or more thermostats or other controllers (not shown). Although not shown, the controller 48 may be linked to the one or more thermostats and/or other controllers directly or via a communications bus (wired or wireless) upon which heat demand calls may be communicated to the furnace. In some cases, the thermostat may short two terminals together to indicate a heat demand call, but this is not required. The controller 48 may also be used to control various components of the furnace 12 including the speed and/or operation of the circulation fan 20, as well as any airflow dampers (not shown), sensors (not shown), or other suitable component, as desired.

In the illustrative embodiment, the controller 48 may be configured to control the burner assembly 14 between a burner ON cycle and a burner OFF cycle according to one or more heat demand calls received from the thermostat. When a burner ON cycle is called for, the controller 48 may initiate an ignition trial of the burner assembly 14 by providing oil to the burner assembly by actuating valve 28, activating the pump 42 to provide pressurized fuel to nozzle 60, and activating motor 50 to drive blower 66 to provide air for mixing with the oil mist to form a good combustible mixture. The controller 48 may also be configured to selectively energize electrodes 62 and 64 using ignition transformer 44 to ignite the combustible mixture. The energized electrodes 62 and 64 may create a "spark" to ignite the combustible mixture and produce a flame. When a burner OFF cycle is called for, the controller 48 may be configured to actuate valve 28 to cease providing oil provided to the burner assembly 14 and shut off motor 50 and pump 42.

As shown in FIG. 3, a flame detector 72 can be provided in or adjacent to the burner assembly 14 in some embodiments. The flame detector 72 may be configured to detect the presence of a flame during an ignition trial and/or the burner ON cycle. In some cases, the flame detector 72 may include a light sensitive detector, such as a light sensitive cadmium sulfide (CAD) cell. However, it is contemplated that any suitable flame detector may be used including, for example, a photodiode, a flame rod, a thermocouple, or any other suitable flame detector.

In the example shown in FIG. 3, flame detector 72, which in some examples may be a CAD cell, be mounted or otherwise secured in the air tube 68 with holder 74 so that it can view the flame when a flame is present. The CAD cell may be electrically connected to the controller 48 via wires 76 and may send an electrical signal to the controller 48 indicating the presence or absence of a flame. For the illustrative CAD cell, the resistance of the CAD cell may be light dependent, with the resistance decreasing with more light (e.g. flame present) and increasing with less light (e.g. no flame). In some instances, the CAD cell may be configured to have a "dark" resistance when no flame is present in the burner, and a "light" resistance when a flame is present. In some cases, the "dark" resistance may be relatively larger than the "light" resistance. For example, the "dark" resistance may be about 20 kilohms, 50 kilohms, 100 kilohms, 500 kilohms, 1 megohm, or any resistances between, for example, 50 kilohms and 1 megohm. The "light" resistance may be about 100 ohms, 200 ohms, 500 ohms, or any resistance between, for example, 100 ohms and 500 ohms. However, it is contemplated that the "dark" resistance and the "light" resistance may be any resistances where the "light" resistance is less than the "dark" resistance. Further, it is contemplated that in some implementations, the light detector may be configured such that the "light" resistance may be greater than the "dark" resistance or, in other words, the resistance of the light detector may increase with more light, if desired.

In some embodiments, the CAD cell may "watch" the burner assembly 14 for a flame on startup and throughout the burner ON cycle. If the flame fails for any reason, the CAD cell may send an electrical signal to the controller 48 indicating that no flame is present, and the controller may shut down the burner assembly 14. In some embodiments, the controller 48 may enter a lockout state to prevent further operation of the burner assembly 14, but this is not required.

Figure 4:
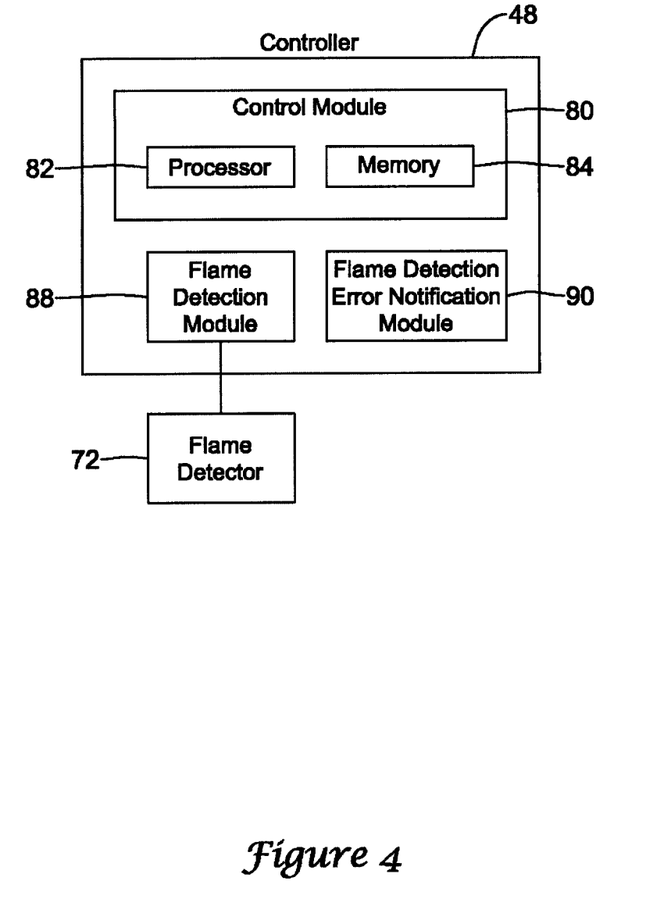
FIG. 4 is a block diagram of an illustrative controller that may be used in conjunction with the oil-fired HVAC system of FIGS. 1-3.

FIG. 4 is a block diagram of an illustrative controller 48 that may be used in conjunction with a fuel-fired system, such as, for example, the oil-fired HVAC system of FIGS. 1-3. It is contemplated that the illustrative controller 48 may be used with any type of fuel-fired appliance, such as gas-fired appliances (e.g. furnace, water heater, boiler, etc.) or oil-fired appliances (e.g. furnace, water heater, boiler, etc.), as desired.

In the illustrative embodiment, the controller 48 includes a control module 80, a flame detection module 88, and a flame detection error notification module 90. Control module 80 may be configured to control the activation of one or more components of the oil-fired HVAC system 10, such as the burner assembly 14, valve 28, and/or oil-fired appliance 12, for example, an oil-fired furnace, in response to signals received from one or more thermostats (not shown) or other controllers. For example, control module 80 may be configured to control the burner assembly 14 between a burner ON cycle and a burner OFF cycle according to the one or more heat demand calls. In some instances, control module 80 may include a processor 82 and a memory 84.

Memory 84 may be configured to store any desired information, such as programming code for implementing the algorithms set forth herein, one or more settings, parameters, schedules, trend logs, setpoints, and/or other information, as desired. Control module 80 may be configured to store information within memory 84 and may subsequently retrieve the stored information. Memory 84 may include any suitable type of memory, such as, for example, random-access memory (RAM), read-only member (ROM), electrically erasable programmable read-only memory (EEPROM), Flash memory, and/or any other suitable memory, as desired.

Flame detection module 88 may be configured to detect whether a flame is present or absence during an ignition trial and burner ON cycle. In some cases, the flame detection module 88 may include suitable circuitry or devices to detect the presence of a flame in the combustion chamber 18. In some cases, the flame detection module 88 may be coupled to or in electrical communication with a flame detector 72, which may be a light or heat sensitive detector. The flame detector 72 may include, for example, a CAD cell, a flame sensing rod, a thermo-couple, a photodiode, and/or other suitable detection device or system capable of detecting the presence or absence of a flame, as desired. The flame detector 72 may be configured to provide an electrical signal having an electrical characteristic (e.g. resistance, current, voltage, etc.) indicating the presence or absence of a flame. For example, in the illustrative embodiment of the flame detector 72 including a CAD cell, as discussed above, the resistance of the CAD cell may be light sensitive, and may vary according to the presence or absence of light from a flame. In some cases, the resistance of the CAD cell may decrease with more light (e.g. flame present). For example, the CAD cell may have a "dark" resistance in the range of 50 kilohms to 1 megohm and a "light" resistance in the range of 100 ohms to 500 ohms. For example, in an example embodiment of the flame detector 72 including a flame sensing rod, a current may be generated in the flame sensing rod when the flame sensing rod is surrounded by the flame. In some example, the stronger the flame, the more current that may be generated, but this is not required. For example, when a flame is present, the flame sensing rod may generate a current ranging from about 3 microamps to about 20 microamps. However, it is contemplated that any suitable current may be generated depending on the flame sensing rod. In any case, if the flame fails or is not detected, the flame detection module 88 may send a signal to the control module 80 indicating that no flame is present and the control module 80 may shut down the burner assembly 14 and/or valve 28.

In some embodiments, a threshold level, such as a flame prove level, may be stored in memory 84 of the control module 80. The threshold level may be a level at which, under normal operating conditions, the electrical characteristic (e.g. resistance, current, voltage, etc.) of the flame detector 72 reliably indicates that a flame is present. When the electrical characteristic of the signal received from the flame detector 72 and/or flame detection module 88 reaches and/or crosses the threshold level, the control module 80 may determine that the burner successfully ignited the fuel and a flame is present. In the example case of a CAD cell, the control module 80 may determine that the burner ignited the fuel and a flame is present when the CAD cell has a resistance that decreases to or drops below the flame prove level. In some cases, the flame prove level may be about 5 kilohms or about 5.3 kilohms, however, any suitable flame prove level may be used, as desired. For an example case of a flame sensing rod, the flame prove level may be about 1 microamp, however, any suitable flame prove level may be used, as desired Flame detection error notification module 90 may be configured to issue a notification or other indication to an operator or service technician if the control module 80 determines that the CAD cell is contaminated, dirty or misaligned. In some embodiments, the flame detection error notification module 90 may include an audible notification and/or a visual notification. Examples of audible notifications may include, for example, an alarm, siren, audible message, and/or other audible notification, as desired. Examples of visual notifications may include, for example, a flashing light, a constant light, a textual message displayed on a display or sent via email, and/or other visual notification, as desired. The flame detection error notification module 90 may alert an operator or service technician that the CAD cell or other light detection is likely contaminated, dirty, misaligned or otherwise unable to properly view the flame.

If the flame detector 72, such as in the case of a CAD cell, becomes contaminated, dirty, misaligned, or otherwise unable to properly detect the presence of a flame, the sensitivity of the CAD cell may decrease, thereby causing the electrical characteristic (e.g. resistance) of the CAD cell to fail to reach and/or cross the flame prove level when a flame is present. In some instances, this contaminated, dirty, or misaligned CAD cell can cause the control module 80 to shut down operation of the burner assembly even through the burner actually successfully ignited the fuel.

In one example, when contaminated, dirty, misaligned, or otherwise unable to properly detect the presence of a flame, the CAD cell may have a "dark" resistance of about 100 kilohms and a "light" resistance of about 20 kilohms. In another example, the CAD cell may have a "dark" resistance of about 50 kilohms and a "light" resistance of 10 kilohms. In either case, with an example flame prove level of 5 kilohms, the "light" resistance of the CAD cell did not decrease to a level below the flame prove level. However, in each example, the resistance of the CAD cell exhibited a significant change in resistance between the "dark" resistance and the "light" resistance. In this illustrative embodiment, the control module 80 may be configured to compare this change in resistance to a predetermined change value and, if the change exceeds the predetermined change value, the control module 80 may determine that a flame is likely to have been present during and/or after the ignition trial, but the CAD cell or flame detector 72 was unable to properly detect the presence of the flame. In other embodiments, the control module 80 may be configured to determine if the resistance dropped below a second threshold that is higher than the flame prove level and, if so, the control module 80 may determine that a flame is likely to have been present during and/or after the ignition trial, but the CAD cell or flame detector 72 was unable to properly detect the presence of the flame. For example, the second threshold level may be about 10 kilohms, 20 kilohms, 25 kilohms, 40 kilohms, 50 kilohms, or any other suitable level that is greater than the flame prove level and can reliable determine that a flame is present. The control module 80 may then activate the flame detection error notification module 90.

In one example, when contaminated, dirty, misaligned, or otherwise unable to properly detect the presence of a flame, the flame sensing rod may have a "dark" current of about 0 amps and a "light" current of about 0.5 microamps. In another example, the flame sensing rod may have a "dark" current of about 0 amps and a "light" current of about 0.7 microamps. In this case, with an example flame prove level of 1 microamp, the "light" current of the flame sensing rod did not increase to a level above the flame prove level. However, in each example, the current of the flame sensing rod exhibited a significant change in current between the "dark" current and the "light" current. In this illustrative embodiment, the control module 80 may be configured to compare this change in current to a predetermined change value and, if the change exceeds the predetermined change value, the control module 80 may determine that a flame is likely to have been present during and/or after the ignition trial, but the flame sensing rod or flame detector 72 was unable to properly detect the presence of the flame. In other embodiments, the control module 80 may be configured to determine if the current increase above a second threshold that is lower than the flame prove level and, if so, the control module 80 may determine that a flame is likely to have been present during and/or after the ignition trial, but the flame sensing rod or flame detector 72 was unable to properly detect the presence of the flame. For example, the second threshold level may be about 0.2 microamps, 0.3 microamps, 0.4 microamps, 0.5 microamps, or any other suitable level that is less than the flame prove level and can reliable determine that a flame is present. The control module 80 may then activate the flame detection error notification module 90.

Although not shown in FIG. 4, it is contemplated that the controller 48 may include a user interface that is configured to display and/or solicit information as well as permit a user to enter data and/or other settings, as desired. In some instances, the user interface may include a touch screen, a liquid crystal display (LCD) panel and keypad, a dot matrix display, a computer, buttons and/or any other suitable interface, as desired.

Figure 5:
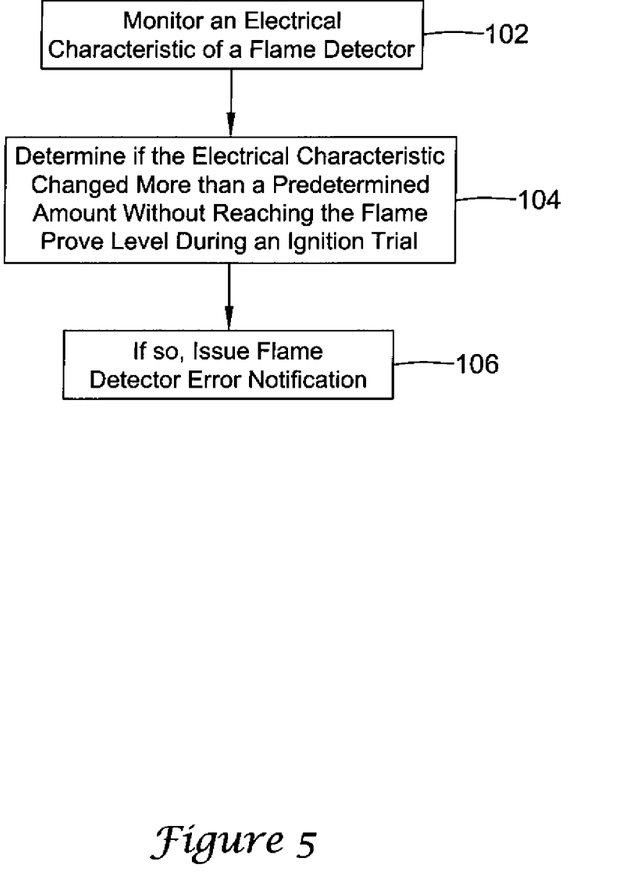
FIGS. 5-6 are flow diagrams showing illustrative methods for issuing a flame detector error notification indicating that the flame detector is contaminated, dirty, misaligned or otherwise unable to properly detect a flame produced by the burner assembly.

FIG. 5 is an illustrative flow diagram of a method of issuing a flame detector error notification indicating that the flame detector 72 is contaminated, dirty, misaligned or otherwise unable to properly view a flame produced by the burner assembly. The illustrative method may be employed by the controller 48 shown in FIG. 4. As shown in block 102, the controller 48 may monitor an electrical characteristic (e.g. resistance, current, voltage, etc.) of a flame detector 72 (e.g. CAD cell, flame sensing rod, etc.). For example, the controller 48 may monitor the electrical characteristic before, during, and/or after one or more ignition trials. In some cases, the controller 48 may track the electrical characteristic of the flame detector 72 and/or changes in the electrical characteristic of the flame detector 72 and store them in memory 84.

In block 104, the controller 48 may determine if the electrical characteristic of the flame detector 72 changed by more than a predetermined amount without reaching and/or crossing a flame prove level during at least a portion of an ignition trial. In some cases, the predetermined amount may be determined according to a percentage of the electrical characteristic or, in other cases, may be a change in value. Example changes in percentages may be 10 percent, 15 percent, 25 percent, 40 percent, 50 percent, 65 percent, and/or other percentages, as desired. If the electrical characteristic of the flame detector 72 is resistance, the predetermined amount may be 10 ohms, 50 ohms, 100 ohms, 200 ohms, 1 kilohms, 5 kilohms, 10 kilohms, 15 kilohms, 20 kilohms, 25 kilohms, 40 kilohms, 65 kilohms, 80 kilohms, 100 kilohms, or any other change in resistance, as desired. If the electrical characteristic of the flame detector 72 is current, the predetermined amount may be 0.1 microamps, 0.2 microamps, 0.3 microamps, 0.5 microamps,or any other change in current, as desired.

If the controller 48 determines that the electrical characteristic of the flame detector 72 did not reach and/or cross the flame prove level, but did change by more than the predetermined amount, then in block 106, the controller 48 may issue a flame detector error notification, indicating the flame detector 72 may be contaminated, dirty, misaligned, or otherwise unable to properly view the flame.

Figure 6:
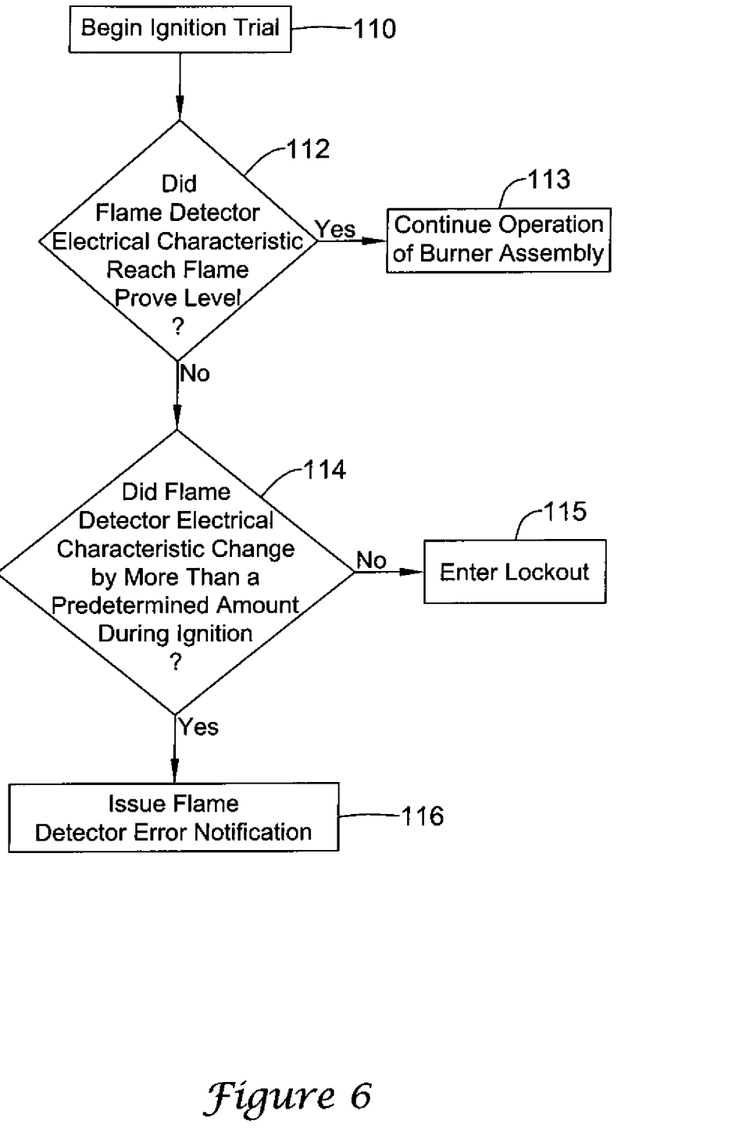

FIG. 6 is an illustrative flow diagram of another method of issuing a flame detector error notification indicating that the flame detector is contaminated, dirty, misaligned or otherwise unable to properly view a flame produced by the burner assembly. This method may be employed by the controller 48 shown in FIG. 4. As shown in block 110, the fuel-fired appliance may begin an ignition trial. Then, in decision block 112, the controller 48 may monitor the electrical characteristic (e.g. resistance, voltage, current, etc.) of the flame detector 72 and determine if the flame detector reached and/or exceeded the flame prove level. If so, then in block 113, the controller 48 may continue normal operation of the burner assembly.

If, however, the electrical characteristic of the flame detector 72 did not reach and/or exceed the flame prove level, then in decision block 114, the controller 48 may determine if the electrical characteristic of the flame detector changed by more than a predetermined amount during and/or after the ignition trial. In some cases, the controller 48 may also cease operation of the burner assembly.

If the electrical characteristic of the flame detector did not change by more than a predetermined amount, then in some cases, as in block 115, the controller 48 may lockout operation of the burner assembly, but this is not required. If the electrical resistance of the flame detector 72 was determined to have changed by more than a predetermined amount in decision block 114, then in block 116, the controller 48 may issue a flame detector error notification indicating that the flame detector is contaminated, dirty, misaligned or otherwise unable to properly view a flame.

In some instances, the flame threshold level (e.g. flame prove level) and/or the predetermined amount are updated or change over time. For example, if it is determined that the predetermined amount that the electrical characteristic of the flame detector changes in response to a detected flame begins to reduce over time, the controller may adjust the predetermined amount and/or the flame threshold level accordingly. Limits may be placed on the amount of adjustment. Under some circumstances, this may help reduce the number of false alarms and/or false lockouts within a fuel fired appliance.

Having thus described the preferred embodiments of the present invention, those of skill in the art will readily appreciate that yet other embodiments may be made and used within the scope of the claims hereto attached.

What is claimed is:

1. A method for detecting a problem with a flame detector in a fuel-fired appliance, wherein the flame detector is configured to detect the presence or absence of a flame generated by a burner in the fuel-fired appliance, the method comprising:
    obtaining an electrical characteristic value of the flame detector at a point in time during a burner ON cycle of the burner;
    determining if the obtained electrical characteristic value of the flame detector at least reached a flame prove level or not, wherein the flame prove level is a level of the electrical characteristic at which if the electrical characteristic value of the electrical signal is above the flame prove level, a flame is indicated to be present;
    if the obtained electrical characteristic value of the flame detector failed to reach the flame prove level, determining if the obtained electrical characteristic value at least reached a predetermined change value that is less than the flame prove level;
    outputting an error if the electrical characteristic value of the flame detector failed to reach the flame prove level but did reach the predetermined change value but not shutting down the burner; and shutting down the burner if the electrical characteristic value of the flame detector failed to reach the predetermined change value.

2. The method of claim 1, wherein a burner ON cycle of the burner includes an ignition trial of the burner.

3. The method of claim 1 wherein the error indicates to an operator that the flame detector is contaminated, dirty, misaligned, or otherwise unable to properly detect the presence of the flame.

4. The method of claim 1 wherein the error comprises an audible alarm.

5. The method of claim 1 wherein the error comprises an error light.

6. The method of claim 1 wherein the error comprises a message displayed on a display.

7. The method of claim 1 wherein the electrical characteristic value of the flame detector is a resistance.

8. The method of claim 1 wherein the fuel-fired appliance is an oil-fired appliance.

9. The method of claim 8 wherein the flame detector includes a cadmium sulfide (CAD) cell.

10. The method of claim 1 wherein the fuel-fired appliance is a gas-fired appliance.

11. The method of claim 10 wherein the flame detector includes a flame sensing rod.

12. A controller for a fuel-fired appliance, the controller configured to be coupled to a flame detector for detecting the presence or absence of a flame during and/or after an ignition attempt of a burner, the controller comprising:
   a flame detector error notification module configured to be selectively activated to indicate a problem with the flame detector;
   a control block operatively coupled to the flame detector and the flame detector error notification module, the control block configured to receive an electrical signal from the flame detector and to obtain an electrical characteristic value of the electrical signal from the flame detector at a point in time during a burner ON cycle of the burner; and
   wherein:
      the control block is configured to determine if the electrical characteristic value of the electrical signal from the flame detector at least reached a flame prove level, the flame prove level is a level of the electrical characteristic at which if the electrical characteristic value of the electrical signal is above the flame prove level, a flame is indicated to be present;
      if the obtained electrical characteristic value of the electrical signal failed to reach the flame prove level but at least reached a predetermined change value that is less than the flame prove level, the control block is configured to activate the flame detector error notification module but does not output a shutdown command for shutting down the burner; and
      the control block is further configured to output a shutdown command for shutting down the burner if the electrical characteristic value of the flame detector failed to reach the predetermined change value.

13. The controller of claim 12 wherein the flame detector error notification module includes an audible alarm.

14. The controller of claim 12 wherein the flame detector error notification module includes an error light.

15. The controller of claim 12 wherein the flame detector includes a cadmium sulfide (CAD) cell.

16. The controller of claim 12 wherein the flame detector includes a flame sensing rod.

17. A fuel-fired appliance system, comprising:
   a burner configured to selectively receive and ignite a fuel to produce a flame;
   a flame detector configured to detect the presence or absence of the flame of the burner;
   an indicator for indicating to an operator a problem with the ability of the flame detector to detect the presence of the flame; and
   a controller connected to the burner, the flame detector, and the indicator,
   wherein:
      the controller is configured to selectively control the operation of the burner and receive a signal from the flame detector corresponding to the presence or absence of the flame;
      the controller is further configured to obtain the signal received from the flame detector at a point in time and to determine if the flame detector is having a problem in properly detecting the presence of the flame using the signal;
      the controller is further configured to activate the indicator if the controller determines that the flame detector is having a problem in properly detecting the presence of the flame;
      the controller is configured to determine that the flame detector is having a problem in properly detecting the presence of the flame by determining that the signal received from the flame detector at the point in time failed to reach a flame prove level but did reach a predetermined change value, the predetermined change value is a threshold value for a change in a value of the signal from a time before a flame is to be present in the burner to the point in time at which the received signal is obtained; and
      the controller is configured to issue a shutdown command for shutting down the burner if the signal received from the flame detector at the point in time failed to reach the predetermined change value.

18. The controller of claim 17 wherein the flame detector includes a cadmium sulfide (CAD) cell.

19. The controller of claim 17 wherein the flame detector includes a flame sensing rod.

* * * * *